United States Patent
Moretti

(10) Patent No.: US 8,875,425 B2
(45) Date of Patent: Nov. 4, 2014

(54) DECORATED CONTAINER ASSOCIABLE WITH AIRLESS PUMPS AND METHOD FOR ITS PRODUCTION

(75) Inventor: Matteo Moretti, Crema (IT)

(73) Assignee: Lumson S.p.A., Capergnanica (CR) (IT)

( * ) Notice: Subject to any disclaimer, the term of this patent is extended or adjusted under 35 U.S.C. 154(b) by 496 days.

(21) Appl. No.: 13/005,307

(22) Filed: Jan. 12, 2011

(65) Prior Publication Data

US 2011/0174764 A1 Jul. 21, 2011

(30) Foreign Application Priority Data

Jan. 15, 2010 (IT) .............................. MI2010A0039

(51) Int. Cl.
| | | |
|---|---|---|
| B65D 23/02 | (2006.01) | |
| B65D 25/38 | (2006.01) | |
| B05B 11/00 | (2006.01) | |
| B29C 49/24 | (2006.01) | |
| B29C 49/06 | (2006.01) | |
| B29K 67/00 | (2006.01) | |
| B29C 49/62 | (2006.01) | |
| B29K 23/00 | (2006.01) | |
| B29L 9/00 | (2006.01) | |
| B29K 709/08 | (2006.01) | |

(52) U.S. Cl.
CPC ........... *B65D 23/02* (2013.01); *B29C 2049/241* (2013.01); *B29C 49/06* (2013.01); *B29K 2067/00* (2013.01); *B05B 11/0037* (2013.01); *B29C 2049/2404* (2013.01); *B05B 11/30* (2013.01); *B29C 49/24* (2013.01); *B29C 49/62* (2013.01); *B29K 2023/12* (2013.01); *B29L 2009/001* (2013.01); *B65D 2203/02* (2013.01); *B29K 2023/06* (2013.01); *B29K 2709/08* (2013.01)

USPC ............ 40/310; 215/12.1; 215/365; 206/457; 206/459.5; 222/105

(58) Field of Classification Search
USPC .................... 215/12.1, 12.2, 365, 10; 40/310; 206/457, 459.5, 515, 516; 220/495.01, 220/123.91; 222/105
See application file for complete search history.

(56) References Cited

U.S. PATENT DOCUMENTS

| | | |
|---|---|---|
| 3,420,413 A | 1/1969 | Corsette |
| 4,691,847 A | 9/1987 | Ford et al. |

(Continued)

FOREIGN PATENT DOCUMENTS

| | | |
|---|---|---|
| EP | 0 763 469 A1 | 3/1997 |
| FR | 2 676 958 | 12/1992 |

(Continued)

*Primary Examiner* — Sue A Weaver
(74) *Attorney, Agent, or Firm* — Novak Druce Connolly Bove + Quigg LLP

(57) ABSTRACT

A container comprising a substantially rigid body formed at least partially of transparent material and having a neck defining an opening providing access to the container cavity, and a bag positioned in the interior of the body. The bag being formed of thermoplastic material and having a neck from which there radially extends a flange which rests on a free edge of the neck of the body and defines a hole for providing access to the cavity of the bag and for sealedly housing the body of a hermetic pump operable manually to withdraw the fluid substance from the bag and feed it to the outside through its dispensing stem. The bag being formed by hot blow moulding of a preform positioned directly within the container. A decorative and/or informative sheet detached from the opening being interposed between said container and said bag, and being visible from the outside of the container.

6 Claims, 3 Drawing Sheets

(56) References Cited

U.S. PATENT DOCUMENTS

| | | |
|---|---|---|
| 4,694,977 A | 9/1987 | Graf et al. |
| 5,043,130 A | 8/1991 | Fujio |
| 5,749,460 A * | 5/1998 | Rice .................. 220/23.83 |
| 5,921,416 A | 7/1999 | Uehara |
| 5,971,224 A | 10/1999 | Garibaldi |
| 6,725,589 B2 * | 4/2004 | Braun .................. 40/310 |
| 6,984,425 B2 * | 1/2006 | Raymond .................. 428/35.7 |
| 2004/0112921 A1 | 6/2004 | Nomoto et al. |
| 2005/0023185 A1 | 2/2005 | Ramet |
| 2005/0067432 A1 * | 3/2005 | Bonneyrat .................. 222/105 |
| 2005/0068182 A1 * | 3/2005 | Dunlap et al. .......... 340/572.8 |
| 2006/0048888 A1 * | 3/2006 | Raymond .................. 156/250 |
| 2008/0011778 A1 | 1/2008 | Ronsin et al. |
| 2008/0034628 A1 * | 2/2008 | Schnuckle .................. 40/310 |
| 2008/0129514 A1 * | 6/2008 | Chisholm .................. 340/572.8 |
| 2010/0044393 A1 | 2/2010 | Moretti |
| 2011/0227258 A1 * | 9/2011 | Patrini .................. 264/526 |

FOREIGN PATENT DOCUMENTS

| | | |
|---|---|---|
| FR | 2 902 083 | 12/2007 |
| FR | 2916674 | 12/2008 |
| JP | 5-31790 | 2/1993 |
| JP | 5-31790 A1 | 2/1993 |
| JP | 5-31791 | 2/1993 |
| JP | 5-31791 A1 | 2/1993 |
| WO | 2009/047021 | 4/2009 |

* cited by examiner

DECORATED CONTAINER ASSOCIABLE WITH AIRLESS PUMPS AND METHOD FOR ITS PRODUCTION

CROSS-REFERENCE TO RELATED APPLICATION

This application claims priority from Italian patent application no. MI2010A000039 filed Jan. 15, 2010, incorporated herein by reference.

FIELD OF THE INVENTION

The present invention relates to a container associable with a manually operable pump for dispensing fluid substances contained under airtight conditions in a deformable bag housed in a rigid body.

BACKGROUND OF THE INVENTION

It is known to enclose fluid substances (both liquid and creamy) in containers from which these substances are dispensed by manually operating a small pump mounted on the mouth of a respective container. Pump operation causes a quantity of fluid substance to be withdrawn from the container in which—if the container is rigid—a vacuum forms which would prevent further substance withdrawal and dispensing, if air were not allowed to enter the container (which generally takes place in those regions in which the pump makes contact with and slides on the pump body), or if the container did not comprise a base sealedly movable along an internal cylindrical surface of the container (see for example U.S. Pat. Nos. 4,691,847, 4,694,977 and 5,971,224): this latter system for compensating the container volume by reducing its internal volume while maintaining the internal pressure constant is however very laborious and costly.

In many cases it is opportune or necessary that the fluid substance to be dispensed by a pump never comes into contact with the atmosphere inside the container (with the dispensing pump mounted on it): sealing the fluid out of contact with the atmosphere is important if the composition of the fluid within the container is not to undergo alteration, or if it is essential that the fluid substance enclosed in the container remains sterile.

JP 05 031790A and JP 05 031791A published on Sep. 2, 1993 describe how a bag of elastically deformable material can be produced directly within a rigid container. The bag is then coupled to a hermetic (airless) pump and deforms during pump delivery.

To form the container, an elongated preform (made of thermoplastic material and having an elongated hollow cylindrical body, open at one end where the preform presents a neck from which a flange radially projects) is inserted into a rigid container having a mouth from which a neck extends, on the free edge of which there rests the flange of the preform, which is heated, thrust towards the container base by a pusher and then inflated within the container, until a bag forms, the outer surface of which adheres (at least for a large part of its surface) to the inner surface of the container. The bag obtained in this manner also has a neck, at least an end portion of which presents outwardly projecting longitudinal ribs, with some radial ribs or projections projecting from that surface of the preform flange which faces the free edge of the neck of the container in which the bag is inserted: these ribs or projections define passages for the air which penetrates from the outside between the container and bag to enable this latter to flatten or inwardly deform during outward dispensing of the fluid substance through the hermetic pump, so preventing the formation inside the bag of a vacuum which would prevent dispensing of the fluid substance.

In the aforedescribed embodiments a label, applied to the outside of the rigid container by gluing, not only carries the various printed information required to identify and market the product, but can also present an attractive decorative design. Applying the label is often a problem. In this respect, a further container processing step must be provided in which this label is applied to the container by gluing.

Moreover the container is directly in contact with the external environment and can discolour (in the case of product exposure to the sun), be ruined by rubbing against the surfaces with which the container comes into contact, deform or even separate from the container.

FR2916674-A1 describes a container having an external rigid body and a deformable bag inside directly formed in it. The bag presents, printed on it, some information visible form the outside of the rigid body. The information printed on the bag are thus protected from outside ambient conditions.

For the production of the cited bag said information are printed on the probe, that after inflation, forms the deformable bag.

When the bag shrinks due to expulsion of the product contained in it, the information printed on the bag is further deformed and can became unreadable.

U.S. Pat. No. 5,043,130-A describes how to produce a rigid container that is not subject to deformation during its use. A label is provided on the outside of the container and integrated in the rigid wall of the container. A possible deformation of the wall of the container derives in a correspondent deformation of the label that thus can make the information printed on it illegible.

US2008/0011778-A1 describes a fluid dispenser assembly comprising an outer receptacle including an opening, said receptacle including an inside wall defining an inside space, an internal trim disposed in the inside space and a dispenser member, such as a pump, for dispensing the fluid. The assembly further comprising a barrier envelope for containing the fluid, said envelope being disposed inside the internal trim so that the fluid is not in contact with said internal trim. The receptacle is made of a transparent or translucent material, such as glass, so that the internal trim is visible through the receptacle, and in that the internal trim is substantially opaque so as to mask at least some, and preferably all, of said barrier envelope.

The insertion of the barrier envelope inside the outer receptacle it is not easy due to the presence of the trim.

SUMMARY OF THE INVENTION

The main object of the present invention is therefore to provide a device of the stated type of easy production, in which the information present on traditional labels or the decoration formed by them is stably and indelibly associated with the container, hence preventing it from decolouration, from detachment from the container, or from undergoing damage, the information do not becoming illegible when the bag containing the product shrinks due to the dispensing of the fluid.

These and other objects are attained by a device in accordance with the technical teachings of the accompanying claims.

The ensuing description provides a non-exclusive embodiment of the device, which is indicated by way of non-limiting example; it is represented with the aid of the accompanying drawings, in which:

DETAILED DESCRIPTION OF EMBODIMENTS

Figure 1:
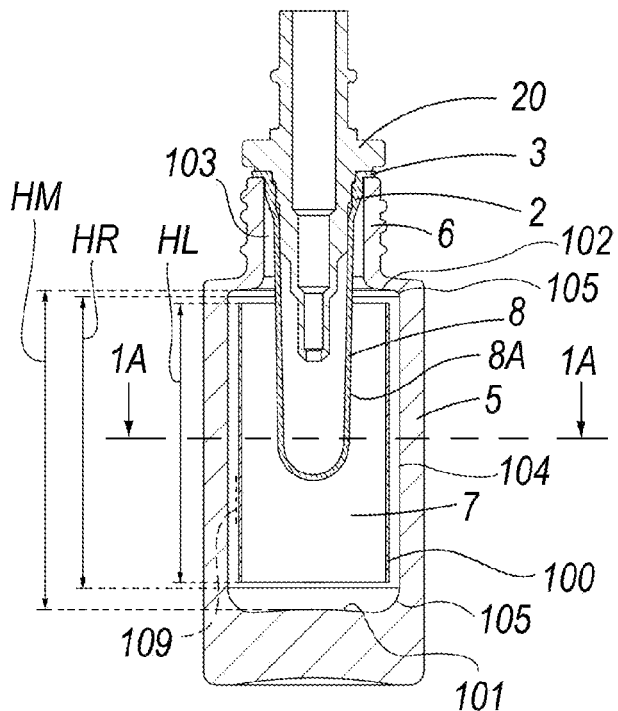
FIGS. 1, 2, 3 and 4 represent in section the various steps in the process by which the container is produced.

Reference will firstly be made to FIG. 1 which represents a first step of the method of the present invention.

Initially an external rigid body 5 is provided having a neck 6 defining an opening giving access to the body cavity 7. The neck presents an external thread 6A used to screw down a hermetic pump (by means of a ring cap) as described hereinafter.

The body 6 is formed at least partially of transparent material, such as transparent plastic or glass.

A preform 8 is provided, formed by moulding a plastic material, such as PE (polyethylene), PET (polyethylene terephthalate), PP (polypropylene) or the like, or by co-injection moulding various layers of mutually different materials. The preform 8 comprises a lowerly rounded elongated body. It also comprises a neck 2 from which a flange 3 radially extends. Teeth (not shown), the use of which is clarified hereinafter, extend from the outer part of the neck.

A decorative sheet 100 is also provided. It is rolled up and inserted through the opening in the rigid body, before inserting the preform.

According to the present invention the decorative sheet is apart (detached) from the opening of the container. In other words the opening of the container is not provided with the decorative sheet, so that the opening is free from the decorative sheet. This allows an easier access to the interior of the cavity.

The decorative sheet can have a length equal to the inner perimeter of the rigid body or less.

The height HL of the sheet 100 can be equal to or lower than the height of the rigid body cavity.

The height of the rigid body cavity is indicated as HM in FIG. 1, and it is substantially the maximum distance between the internal base surface 101 of the cavity and the ceiling 102 of the cavity.

As it can be notice from FIG. 1, the cavity of the container 5 is defined by a cylindrical surface connected by chamfered parts to the base 101 and to the ceiling 102. In the section of FIG. 1 the cylindrical surface is represented by a rectilinear line 104 chamfered at the conjunctions 105 with the base and the ceiling. The height of the cylindrical surface corresponds to the length of the rectilinear line 104.

According to a particular embodiment of the present invention the height HL of the sheet 100 is equal or lower than the height HR of the cylindrical surface present in the cavity. This allows the sheet to lie perfectly only on a cylindrical surface avoiding the formation of winkles in the sheet during the expansion of the bag In fact if the sheet is pushed against the chamfers of the cavity, the formation of winkles is certain.

Advantageously the decorative sheet can present, preferably on that surface facing the rigid body, a series of decorations, information relative to the product contained in the bottle, trademarks, writings of any kind or any other information or decoration which is usually printed on a normal label glued to a container.

The sheet can be made of different materials which possess elastic properties such that it can be unrolled from the rolled-up position. Paper supports could be used protected by a covering of various plastic materials such as PE or PS, or other materials.

The sheet could also be made completely of pre-printed plastic laminate, formed of materials able to be decorated by automatic equipment such as lithography, offset etc.

The advantages would be those of being able to decorate the sheet and place it in the container interior such as to prevent its contact with the product, hence without particular chemical compatibility requirements.

Another possibility would be to place in the container interior a sheet with an included microchip (represented in dotted lines only in FIG. 1), for example of the RFID type containing information relative to the product, or a metal antitheft band 109 or the like. The sheet cannot be removed in any manner without breaking the container.

The sheet can evidently be made of coloured or transparent material. Moreover it could be moulded with high or low relief, with metal inserts such as holograms or the like.

The transverse body dimensions of the preform 8 are such that it can be freely inserted into the rigid body 5, with the free ends of the teeth substantially in contact with the inner surface of the bore through the neck 6, while the preform neck 2 is profiled and has dimensions such that it easily penetrates into the bore in the neck 6 of the body 5, with the free ends of the teeth being substantially in contact with the inner surface of the hole in the neck 6, and the projecting flange 3 of the preform resting on the end of the neck 6 but without sealedly adhering to it because spaced-apart radial ribs or projections (also not shown) project from the lower surface (with respect to FIG. 1) of the flange 3. This is possible because the opening is free from the sheet 100.

In this manner, free passages form between the flange 3 of the preform neck and the end edge of the container neck 6, whereas other free passages also form (between each tooth 4 and the tooth adjacent to it) between the outer surface of the preform neck 2 and the inner surface of the hole in the neck 6 of the rigid body 5.

Essentially, the chamber 7 is in free communication with the outside.

The preform is heated to a temperature sufficient to soften (plasticize) the plastic material forming the preform. In the present method it is heated, by way of example, to a temperature of 120° C. for a time between 4 and 7 seconds.

Figure 1A:
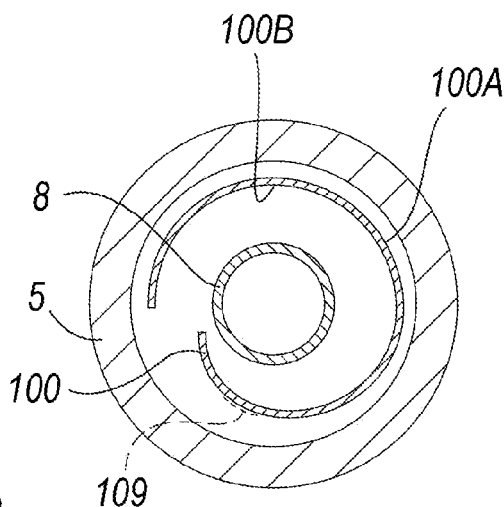
FIG. 1A is a section taken on the line 1A-1A of FIG. 1.

Once heated, it is inserted into the body 5, into which the at least partly rolled-up sheet 100 has been previously inserted, to hence obtain a situation such as that of FIG. 1. The situation created is also well visible in the cross-section of FIG. 1A.

The preform flange 3 rests on the edge of the neck 6 of the body 5. As can be seen from the figure, a nozzle 20 is inserted into the preform and is sealedly connected to the neck 2 of the preform 8. The sealed connection is made in known manner.

Figure 2:
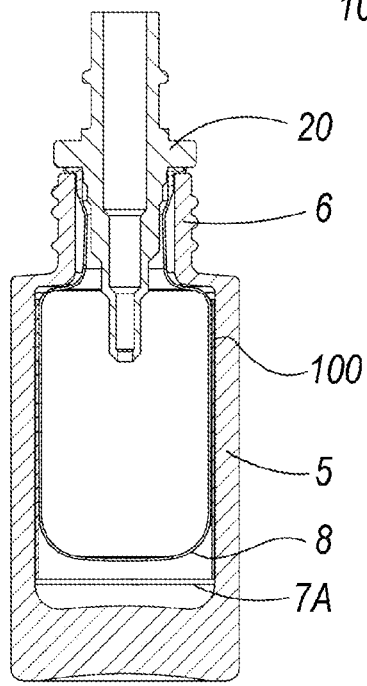
Figure 3:
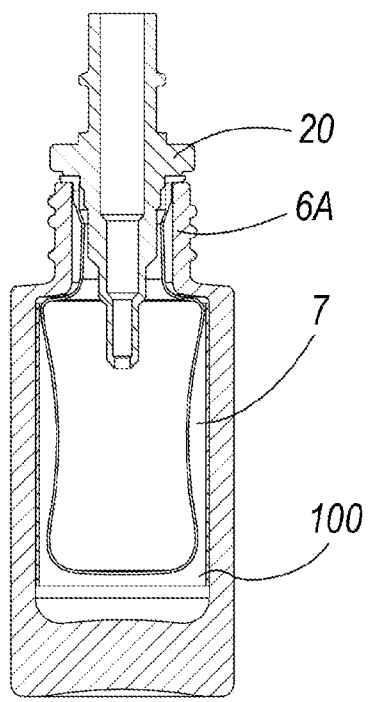

A first air jet is then fed into the preform to inflate the preform 8 such as to form a bag 8 (indicated by the same reference numeral as the preform) which at least partially occupies said body cavity (FIG. 2). The inflating air or fluid fed into the preform interior has a pressure between 2 and 10 bar, depending on the preform thickness, but preferably 3 bar. The air jet feed into the preform lasts for about 0.5-1 second. The jet air is at ambient temperature, but can also be hotter depending on requirements.

Specifically, feeding air into the preform causes the bag to inflate and unroll the sheet 100, then to urge it into contact with the walls of the cavity 7. The bag swells until the pressure of the air trapped within the interspace which forms between the bag and the walls of the cavity 7 reaches a value equal to the pressure of the air fed into the preform. The bag inflation can hence be only partial.

The bag is maintained under pressure while the air present in the interspace is allowed to seep from some part towards the container neck, much higher inflation pressures being used to accelerate air seepage.

Alternatively the initial air jet is interrupted to nullify (i.e. by making it equal to the external pressure) the pressure within the bag. The compressed air present in the interspace 7A hence squashes the bag to separate it from the walls defining the cavity, and seeps upwards to emerge from the neck.

This procedure causes the bag to substantially separate from the container inner walls.

Figure 4:
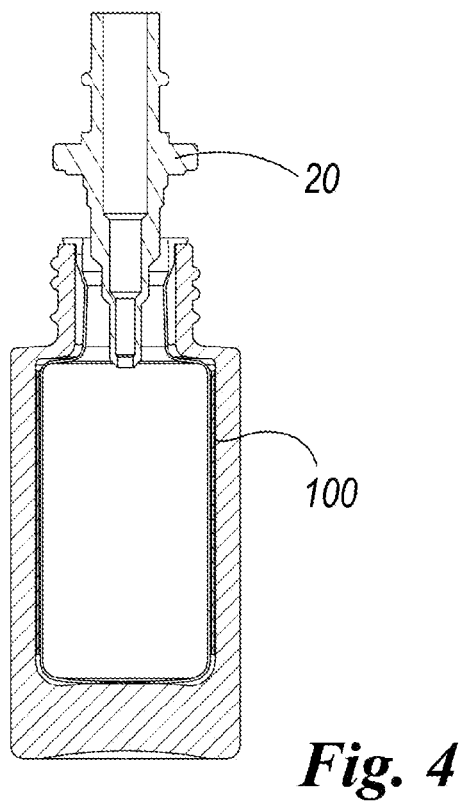

After the time required to squash the bag and for the air to escape from the interspace 7A has passed (about 0.5-1 second), a further air jet is fed into the bag (FIG. 4).

This time the bag 8 fills the cavity 7 completely (FIG. 4). In this respect, the air remained trapped within the interspace 7A has an initial volume less than that present between the preform and the cavity walls during the preceding step and is able to escape completely, so enabling the bag to be completely inflated (FIG. 4).

The latter air jet is maintained for a time slightly longer than in the previous step. This enables the small air quantity remaining in the interspace to escape.

Figure 5:
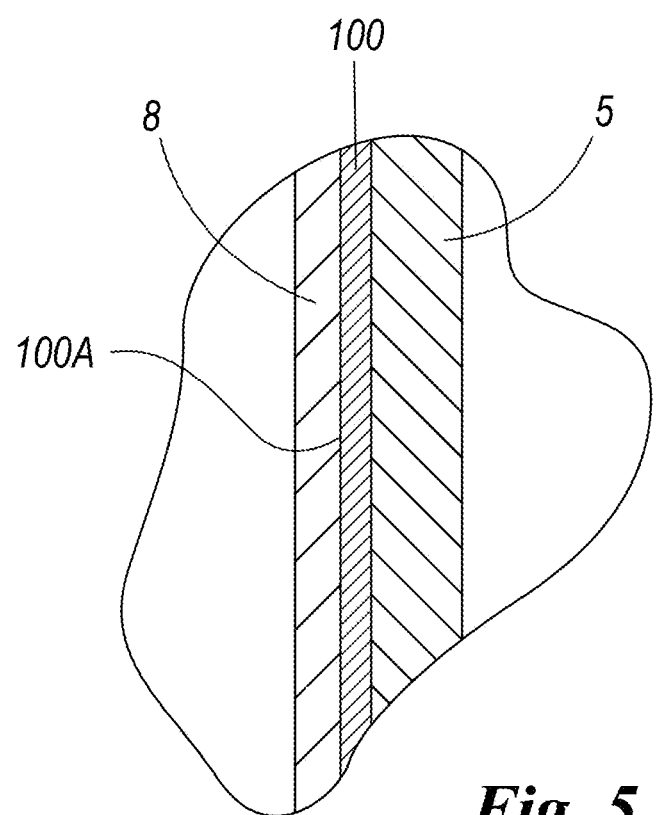
FIG. 5 shows an enlarged detail of FIGS. 2 and 4.

FIG. 5 shows an enlargement of the situation which arises during this step, and also in the step of FIG. 2. The bag is in contact with the sheet 100 which is squeezed and pressed against the wall defining the cavity of the container 5.

On termination of this step the jet is halted and the nozzle 20 extracted.

A bag inflation method has been described and illustrated comprising two inflation stages. Essentially two successive jets are fed, spaced apart by suitable pauses. This cycle has a duration of about 4-7 seconds for a container of 30 ml.

More successive jets may be required, depending on the container and bag dimensions. Essentially, the air injection step and the subsequent jet interruption to enable venting of the air situated in the interspace outside the bag can be repeated as many times as required.

At least one air venting step can be provided, and hence at least one interruption in the air jet for inflating the bag. Consequently at least two inflation jets will be provided, spaced apart by at least one inflation pause or interruption.

It should be noted that the successive air jets fed into the bag can have a constant pressure (for example 3 bar as indicated above), or can have a pressure which varies depending on the current inflation step. For example the first jet fed into the bag can have a lower pressure than the final maintaining jet, or vice versa. Consequently pressure regulation can be optimized, even with differences between one jet and the next, to obtain maximum possible uniformity of bag thickness.

To complete the description, it should be noted that the user receiving the container 5 with the bag 8 (FIG. 4) and the sheet 100 already inserted and retained in it, introduces into the bag (through the opening in its neck 2) the desired quantity of fluid substance, which can fill the bag as far as its neck 2. The said user then inserts into the bag 8, through the opening in its neck, a manually operable pump having a dispensing stem (which projects to the outside of the bag 8 and of the container 5) and a dip tube which is immersed in the fluid substance contained in the bag.

A pump (not shown) is then locked securely onto the neck 6 of the container in known manner, for example by a ring cap (not shown) having an internal thread which is screwed onto threads or helical ribs 6A projecting from the outside of the container neck 6.

The ring cap (not shown) rests on the upper surface of a collar which projects radially from the pump body and presses into sealed contact with the flange 3 of the neck 2 of the bag 8, hence pressing the lower part of the pump into the cavity of the bag neck 2 where it forms a seal, this seal being further improved by an elastic ring positioned immediately below the collar.

The container 5 can evidently be made of any rigid or substantially rigid material (in addition to glass), for example of aluminium or other metal, or of rigid plastic.

In all cases, for correct pump operation it is important that the interspace 10 be in contact with the external environment, for example via the described passages formed between the container neck and the bag neck, below the flange.

One or more holes for air passage can however be provided in the container, as illustrated in U.S. Pat. No. 3,420,413 and U.S. 2004/0112921 A1, in any position therein.

Advantageously, the bag presents means (i.e. the flange 3) for connection to a ring cap for fixing said pump to said container. These means, for example, engage the ring cap thread and enable the bag to be extracted from the body 5 during removal of the ring cap (and hence of the pump) from the container.

As already stated, there is absolutely no need for inflation to take place in two separate steps between which the air jet into the preform/bag is interrupted, however it is essential that between the outer surface of the preform and the walls defining said cavity a decorative sheet be disposed, which remains visible from the outside through the transparent container.

The sheet, being inserted into the container interior, remains protected against those agents which could damage it or alter its form or the information provided on it.

As it is protected by the container it can be made of materials less resistant than those used for traditional labels. This allows a considerable cost saving.

Advantageously, according to another aspect of the invention, a very thin layer of adhesive material can be provided on the outer surface 100A of the sheet. In this manner, when the bag presses the sheet 100 against the inner surface defining the cavity of the body 5, the sheet remains attached to the inner perimeter of the cavity.

This enables the sheet to also remain in position during the subsequent use of the product contained inside the deformable bag.

In this respect, as explained above, in dispensing the product by an airless pump, the bag is made to undergo squeezing and deformation so that it separates from the container walls, to slacken and finally cease its pressure against the sheet.

Advantageously the sheet can be formed with an opaque finish or surface, which prevents the bag from being seen from the outside during its deformation.

In addition, before inflating the preform a lubricant fluid can be applied either to the inner surface 100B of the sheet or to the outer surface 8A of the preform.

Various embodiments of the invention have been illustrated, however others can be conceived utilizing the same inventive concept.

The invention claimed is:
1. A container comprising:
a substantially rigid body formed at least partially of transparent material and defining a container cavity therein, the rigid body further comprising a neck; said neck defining an opening providing access to the container cavity; the internal perimeter of the container cavity being substantially larger than the internal perimeter of the neck, and a bag positioned in the interior of the container cavity, the bag being formed of thermoplastic material and having a neck from which there radially extends a flange which rests on a free edge of the neck of the body and which defines a hole for providing access to the cavity of the bag and for sealedly housing the body of a hermetic pump operable manually to withdraw a fluid substance from the bag and feed the fluid substance to the outside of the bag through a dispensing stem of the pump, the bag being formed by hot blow moulding a preform positioned directly within the container, a decorative sheet; the decorative sheet being self-sustaining and separate from the bag and the body; the decorative sheet being interposed between said container cavity and said bag, and, when so interposed, the decorative sheet having an external perimeter greater than the internal perimeter of said neck defining the opening, said decorative sheet being visible from the outside of the container, wherein the container cavity has a height and the decorative sheet presents a height equal to or lower than the height of the container cavity in a part of said container cavity comprised between a base and a ceiling in the container cavity, the ceiling presenting said opening, and the base comprising a closed surface, whereby the opening of the container is free from said decorative sheet.

2. A container as claimed in claim 1, wherein a microchip and/or a metal antitheft band are associated with the decorative sheet.

3. A container according to claim 1, wherein the height of the sheet prevents the formation of winkles in said sheet during the formation of the bag.

4. A container as claimed in claim 1, wherein the rigid body is formed of glass, and/or wherein the preform/bag is formed of PET and/or PE and/or PP and/or by co-injection moulding various layers.

5. A container as claimed in claim 1, wherein said decorative sheet presents, on at least a portion of a surface thereof facing a wall defining said container cavity, at least one layer of adhesive material.

6. A container as claimed in claim 1, wherein said bag presents means for connecting the bag to a ring nut for fixing said pump to said container, said connection means being for enabling the bag to be extracted from the body during the removal of the ring nut from the container.

* * * * *